US007005599B2

(12) United States Patent

Faslivi et al.

(10) Patent No.: US 7,005,599 B2
(45) Date of Patent: Feb. 28, 2006

(54) PLASMA TORCH

(75) Inventors: Giuseppe Faslivi, Rome (IT); Medardo Pinti, Rome (IT); Renato D'Angelo, Rome (IT)

(73) Assignee: Centro Sviluppo Materiali S.p.A., Roma (IT)

( * ) Notice: Subject to any disclaimer, the term of this patent is extended or adjusted under 35 U.S.C. 154(b) by 0 days.

(21) Appl. No.: 10/478,959

(22) PCT Filed: May 29, 2002

(86) PCT No.: PCT/IT02/00344

§ 371 (c)(1),
(2), (4) Date: Sep. 7, 2004

(87) PCT Pub. No.: WO02/098190

PCT Pub. Date: Dec. 5, 2002

(65) Prior Publication Data

US 2005/0016968 A1 Jan. 27, 2005

(30) Foreign Application Priority Data

May 29, 2001 (IT) ......................... RM2001A0291

(51) Int. Cl.
*B23K 9/00* (2006.01)

(52) U.S. Cl. ............................... 219/121.49; 219/121.5

(58) Field of Classification Search ........... 219/121.11, 219/121.36, 121.37, 121.39, 121.48, 121.49, 219/121.5, 121.52
See application file for complete search history.

(56) References Cited

U.S. PATENT DOCUMENTS

| | | | | |
|---|---|---|---|---|
| 3,141,953 A | | 7/1964 | Browning et al. | |
| 3,610,796 A | | 10/1971 | Decorso et al. | |
| 4,059,743 A | * | 11/1977 | Esibian et al. | 219/121.36 |
| 4,594,496 A | | 6/1986 | Bebber et al. | |
| 5,406,047 A | | 4/1995 | Katschinski et al. | |
| 5,736,708 A | * | 4/1998 | Delzenne | 219/121.51 |
| 6,013,893 A | | 1/2000 | Schneider | |

FOREIGN PATENT DOCUMENTS

| | | |
|---|---|---|
| DE | 44 44 763 | 6/1996 |
| EP | 0 194 634 | 9/1986 |
| GB | 2 355 379 | 4/2001 |

OTHER PUBLICATIONS

Patent Abstracts of Japan, vol. 1996, No. 3, Mar. 1996 & JP 07 303971 A (Toyota Auto Body Co Ltd), Nov. 21, 1995 abstract.

* cited by examiner

*Primary Examiner*—Tu Hoang
(74) *Attorney, Agent, or Firm*—Browdy and Neimark, PLLC

(57) ABSTRACT

Plasma torch (8; 10) of improved performances, comprising: an electrode (13) provided with a respective electrode head (18; 37); a nozzle (14); and an outside jacket (26), there being formed a first cooling circuit (20, 21) of a coolant for the electrode head (18; 37) having an end passage (22), said head being characterised in that it comprises a device (25) for disposing of the electrode heat, located inside of the first cooling circuit.

16 Claims, 4 Drawing Sheets

PLASMA TORCH

The present invention refers to the field of the plasma torches, of the type employed in plasma furnaces, e.g. utilized for destroying liquid and solid waste products.

With reference to the attached FIGS. 1 and 2, schematically and sectionally depicting two typologies of electric plasma furnace, a first example of furnace 1 comprises a container 2 fed with scrap metal, waste products, various slags, toxic and pollutant compounds to be thermally destroyed, etc., that upon melting form a bath 3 onto the bottom 4 of the container 2.

With reference to the sole FIG. 1, at said bottom 4, the container 2 comprises a hearth 5 acting as anode, being part of an electric circuit whose generator is not shown. The container further comprises a top dome 6 crossed by a lance 7 employable for injecting liquid and gaseous materials, fuel (comburent), and/or destined to destruction. Moreover, said dome is crossed by a plasma torch 8 (single torch) that acts as circuit cathode, molten and aeriform components being injected therethrough. The voltage applied sparks an arc 9 between the proximal end 10 of the torch 8 near to the surface of the bath 3. The high current combined to the high resistance at the arc causes, by Joule effect, the production of heat. This entails a very high raise in the temperature (15.000° C. and above) hence the torch-injected matter acquires the state of a plasma.

With reference to the sole FIG. 2, a second example of twin torch furnace 1 has the container 2 void of the hearth 5. Instead, a pair of torches crosses the dome 6. The first torch 8 acts as circuit cathode, whereas the second torch 11 acts as circuit anode. In this case, the plasma electric arc 9 sparks between the distal ends 10, 12 of the torches 8, 11, and at the surface of the bath 3, when the lance 7 is positioned between the torches 8, 11.

It is understood that the hereto given description of these furnace typologies is general, and aimed at explaining the operating conditions of an anodic or cathodic torch.

Both the abovementioned torches have the same functional and structural design. Each torch substantially consists of an electrode, a nozzle and an outside jacket.

In general, each one of the three components is cooled with deionized water. The cooling water is circulated inside the electrode via an inside piping, e.g. of brass, that reverses the water flow.

Examples of this type of torches are taught in U.S. Pat. No. 5,376,767 (Heanley et al.), in GB Pat. Appln. 2,355,379 (Tetronics) and in PCT Appln. WO/90/10366 (Tetronics et al.). However, these torches are not free from drawbacks. In fact, the heads of the nozzles and of the outside jackets are made of Copper and are soldered to steel pipings forming the body of these components by electric soldering carried out with Silver-base alloy. Therefore, during the normal plant operation (with the ignited plasma) the soldering material can melt, causing the loss (spilling) of cooling water inside of the oven and at the plasma zone, with the entailed operation instability and plasma quenching.

Moreover, onto the outside jackets there tends to deposit a layer of carbonaceous substance onto which liquid corrosive substances, like e.g. hydrochloric acid, generated during the thermal destruction process can be adsorbed. Due to the low local temperature of the water-cooled torch, said substances condensate and attack the metal surface of the outside jacket. Over time, jacket corrosion causes the embrittlement and the consequent breaking thereof.

Concerning the anodic torch, it suffers from further drawbacks, substantially due to the reduced surfaces onto which the current flow localizes, both during the firing phase and during the normal operation, causing microfusions and punctures.

Concerning instead the deionized water-cooling, it causes a remarkable energy loss, limiting the performance of the entire system.

The technical problem underlying the present invention is to provide a plasma torch overcoming the drawbacks mentioned with reference to the known art.

This problem is solved by a plasma torch, comprising an electrode provided with a respective electrode head, a nozzle and an outside jacket, there being formed a first cooling circuit of a coolant for said electrode head having an end passage, said head being characterised in that it comprises means for disposing of the electrode heat, located inside of the first cooling circuit.

Hereinafter, the present invention will be described according to a preferred embodiment thereof, together with some preferred embodiments thereof, given by way of a non-limiting example with reference to the following examples and to the attached drawings, in which, besides from the abovementioned FIGS. 1 and 2:

Figure 3:
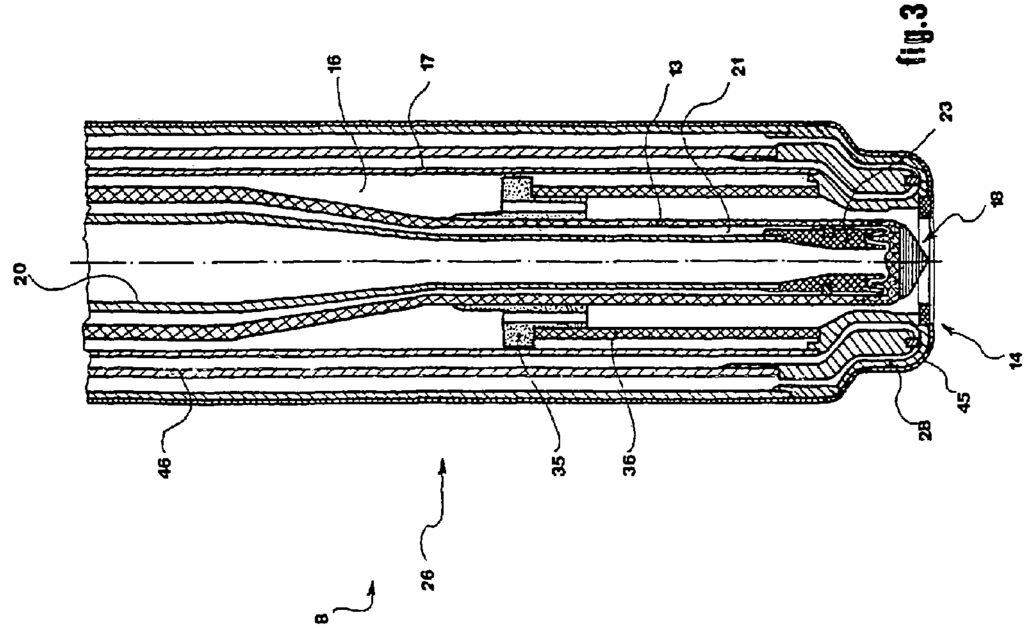
FIG. 3 is a longitudinal sectional view of a plasma torch according to the invention, in particular a cathodic torch.
Figure 5:
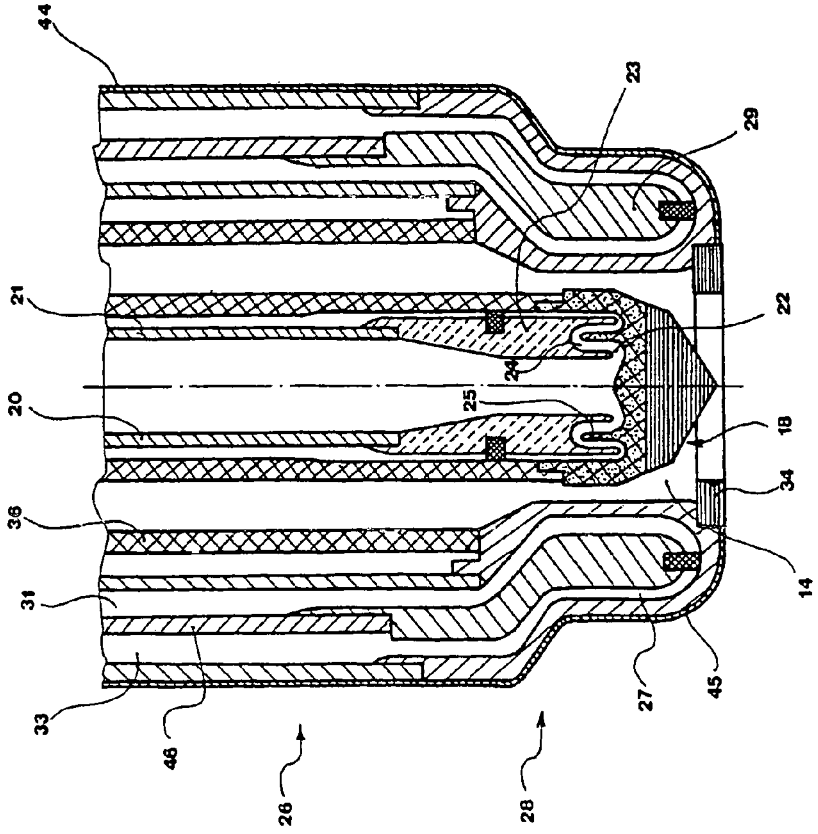
FIG. 5 is a sectional detailed view of the proximal end of the torch of FIG. 3.

With reference to FIGS. 3 and 5, a cathodic torch 8 has a tubular body, having concentric members. Starting, from the central axis of symmetry, inside to outside, the torch comprises an electrode 13 that is inserted in a nozzle 14 made of a tubular pass 16 and of tubular walls 17.

The electrode 13, at the proximal end 10 of the torch 8, comprises an electrode head 18 ending with a metal coating 19.

Said metallic material coating 19 has a >1600° C. melting temperature, it is suitably made of Tungsten and applied by a plasma spray technique.

Inside of the electrode 13 it is located a first reversing pipe 20, that extends to the head 18 defining a first toroidal duct 21 between the inside walls of the electrode 13 and the outside wall of the first reversing pipe 20. At the head 18, the first reversing pipe 20 is spaced, leaving a first end passage 22.

In particular, the first reversing pipe 20 ends in a coolant reversing member 23 in which it is formed, at the head 18, a toroidal slot 24. Complementarily, the point 18 has, internally to the electrode 13, a toroidal flap 25, formed in the electrode head 18, that is inserted in the toroidal slot 24, so as to impart an U-shaped course to the end passage 22.

The first toroidal duct 21 is connected inside of the first reversing pipe 20 by the first end passage 22, thereby defining a first internal cooling circuit that has its ascending section in the first toroidal duct 21 and its descending section inside of the first reversing pipe 20.

Hereinafter, for 'descending' proximal end-wise is meant, and for 'ascending' the opposite is meant.

Moreover, the torch 8 comprises an outside jacket 26 defining, with the tubular walls 17, a toroidal gap inside which it is housed a second reversing pipe 46, located so as to leave, at the proximal end 10 of the torch 8, a second end passage 27.

Notably, the outside jacket 26 ends in a nozzle head 28 connected to the tubular walls 17 of the nozzle 14. Also the second reversing pipe 46, alike the first ends in a respective second reversing member 29 and defines said second end passage 27 therat.

The second reversing pipe 46 defines, with the second end passage 27, the tubular walls 17 and the outside jacket 26, a first external cooling circuit having a toroid-shaped inside descending section 31, and an outside descending section 33.

The nozzle head 28 comprises, at the proximal end 10 of the torch 8, a refractory material ring 34. Moreover, the nozzle 14 incorporates a dispensing member 35 apt to swirl the plasmogen gas that descends along the tubular gap 16. The dispensing member 35 is supported onto the body of the outside jacket by a ceramics material insulator 36.

The nozzle head of the cathodic torch 8 is tapered.

An anodic torch structured according to the same principles of the preceding examples will be described hereinafter. Likewise numbers will indicate likewise components.

Figure 2:
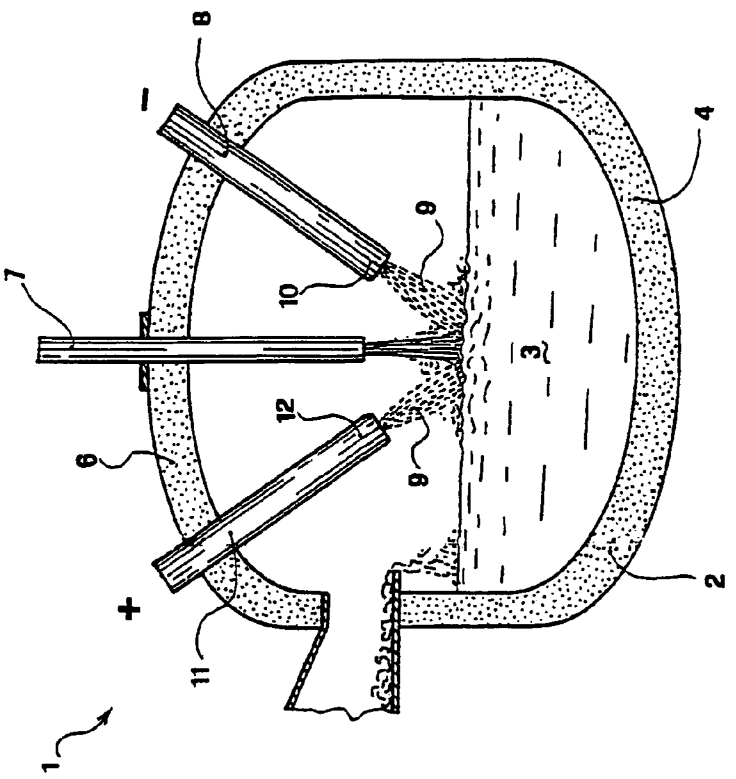
fig.2 PRIOR ART
Figure 1:
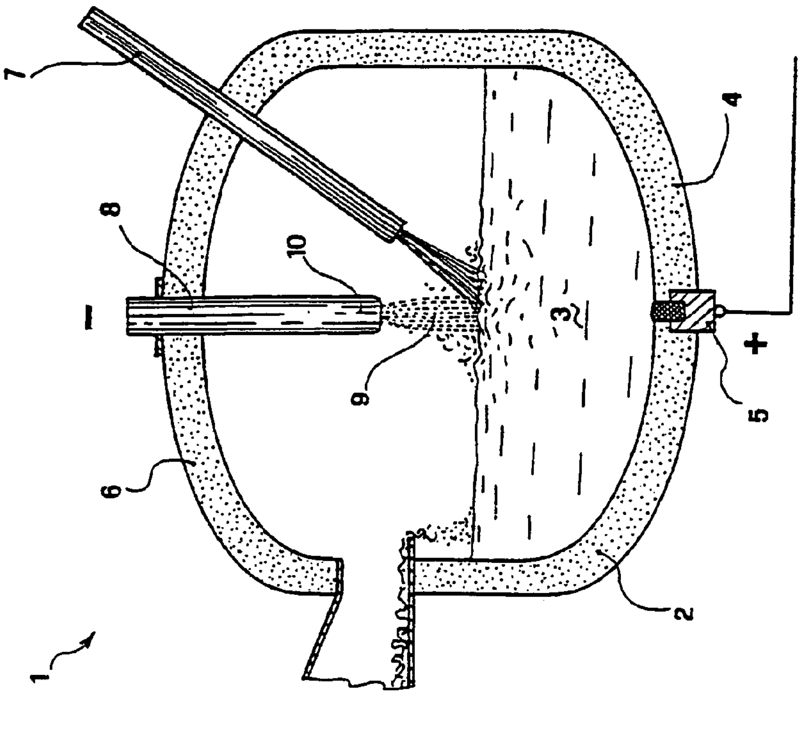
fig.1 PRIOR ART
Figure 4:
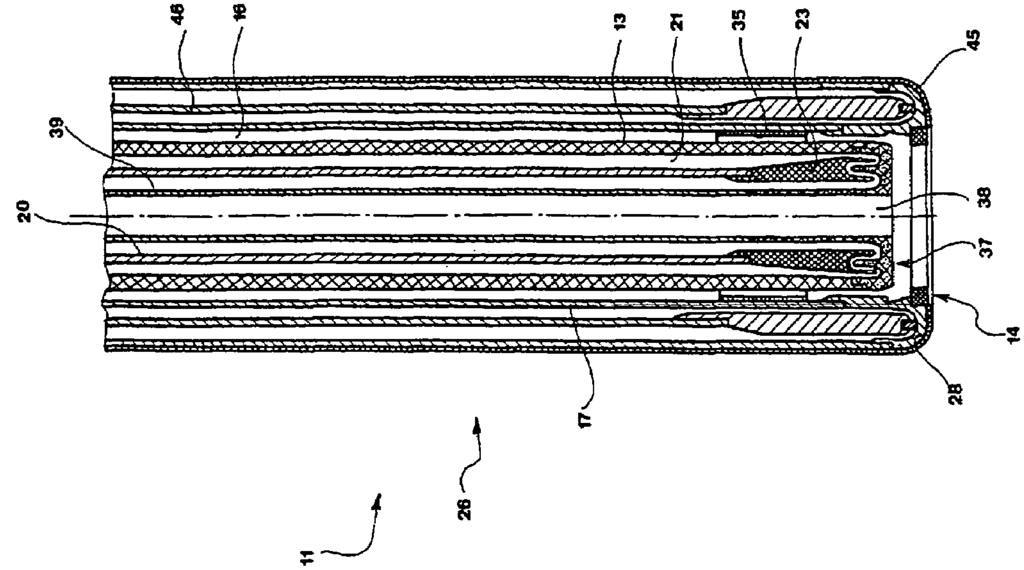
FIG. 4 is a longitudinal sectional view of another plasma torch according to the invention, in particular an anodic torch.
Figure 6:
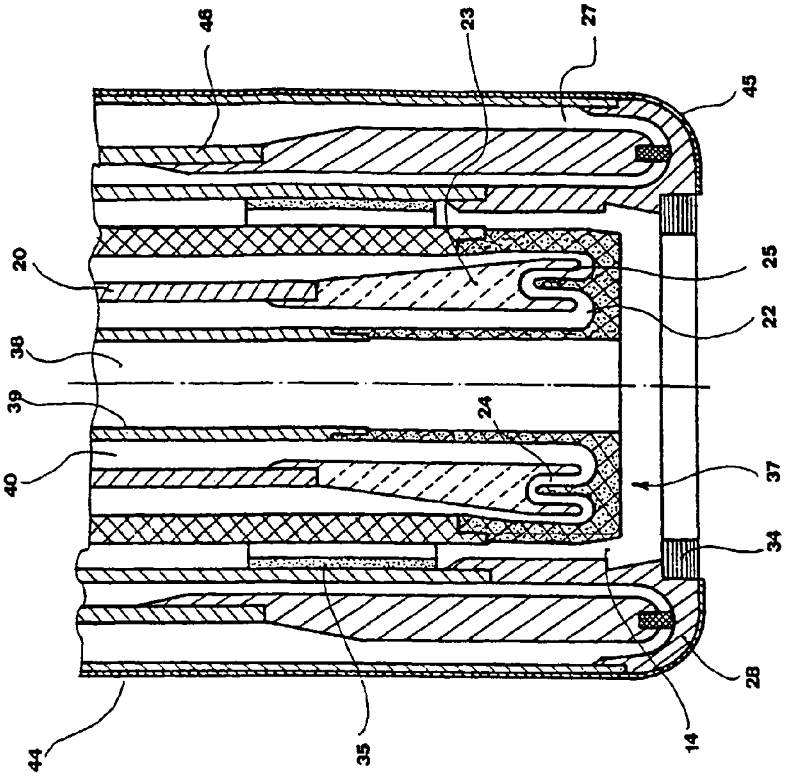
FIG. 6 is a sectional detailed view of the proximal end of the torch of FIG. 4.

With reference to FIGS. 4 and 6, an anodic torch 10 has it also a tubular body, having concentric members. Starting again from the central axis of symmetry, inside to outside, the torch comprises an anodic electrode 37 that is inserted in a nozzle 14 made of a tubular pass 16 and of tubular walls 17.

The anodic electrode 37, at the proximal end 12 of the torch 10, comprises an electrode head 18 having a central port 38, opened on the inside of the anodic electrode 37. Inside of the electrode 37 there is located a first reversing pipe 20 that extends to the head 18, defining a first toroidal duct 21 between the inside walls of the electrode 13 and the outside wall of the first reversing pipe 20. At the head 18, the first reversing pipe 20 is spaced, leaving a first end passage 22.

In particular, the first reversing pipe 20 ends in a reversing member 23 having, at the head 18, a toroidal slot 24. Complementarily, the point 18 has, internally to the electrode 37, a toroidal flap 25 that is inserted in the toroidal slot 24, so as to impart an U-shaped course to the end passage 22.

From the central port 38, running through the entire electrode body and thereby enabling the flow of plasmogen gas and/or of optional materials to be thermally destroyed, there concentrically branches out an inside pipe 39 defining, together with the first reversing pipe 20, a second toroidal duct 40 connected to the first toroidal duct 21 by the first end passage 22, thereby defining a first internal cooling circuit that has its ascending section in the first toroidal duct 21 and its descending section in the second toroidal duct 40.

Said first cooling circuit is apt to be crossed by refrigerated fluid, in particular deionized water chilled by a suitable conditioning apparatus.

The head 18 of said anodic electrode 37 is suitably coated with a metal coating having >0.8 reflectivity, preferably selected from the group comprising Molybdenum, Nickel.

Moreover, the anodic torch 10 comprises an outside jacket 26 that defines, with the tubular walls 17, a toroidal gap inside which it is housed a second reversing pipe 46, located so as to leave, at the proximal end 10 of the torch 8, a second end passage 27. Notably, the outside jacket 26 ends in a nozzle head 28 connected to the tubular walls 17 of the nozzle 14. Also the second reversing pipe 46, alike the first one ends in a respective second reversing member 29 and defines said second end passage 27 thereat.

The second reversing pipe 46 defines, with the second end passage 27, the tubular walls 17 and the outside jacket 26, a first external cooling circuit having a toroid-shaped inside descending section 31, and an outside descending section 33.

The nozzle 14 incorporates a dispensing member 35 apt to swirl the plasmogen gas that descends along the tubular gap 16. The dispensing member 35 is directly fixed to the tubular walls 17.

The anodic torch 10, at the proximal end thereof, has a diameter uniform to the remaining torch body. Moreover, the nozzle head 28 comprises, at the proximal end 10 of the torch 8, a refractory material ring 34.

Hence, both abovedescribed torches share specific features, among which a ceramics coating 44, e.g. of Zirconium oxide ($ZrO_2$) needs mentioning. This coating may be deposed by a Plasma spray technique, obtaining a thickness ranging from 30 to 70 $\mu$m, preferably of 50 $\mu$m.

For both torches, the electrode head 18 with the toroidal flaps 25 is made of a highly thermally and electrically conductive material, in this example Copper.

The toroidal flap 25 is a means for disposing of the heat from the electrode to the first cooling circuit, and it is located inside of the latter.

In particular, the presence of this flap does not merely enable an overall temperature decrease and a higher heat disposal efficiency, but also an increase in the exchange surface and a more pronounced tortuosity of the course enabled to get rid of the degenerative phenomena typical of the anodic torch.

A variant provides that also the electrode head be coated with a high-reflectivity metal coating, to further decrease the amount of heat removed by the cooling water.

Preferably, the refractory material ring 34 defining the mouth of the nozzle 14 is made of Silicon carbide (SiC), whereas the insulator 35 of the cathodic torch 8 is made of Aluminium oxide ($Al_2O_3$).

The presence of this ring enables the latter to act as diaphragm, modifying the electrofluidodynamic conditions of the plasma generating zone, i.e. at the circuit-making zone.

In fact, the ring steers the trajectory of the plasmogen gas centrewise, forming a plasmogen gas cushion. The preselected material stands out for adequate mechanical strength, high melting temperature and reduced thermal and electrical conductivity.

The addition of the ring increases the stability of the plasma under any operating condition, improving the distribution thereof and thereby making the presence of fluidodynamic disturbances irrelevant.

Moreover, said addition improves the reliability, by avoiding random electric arc quenchings between the plasma and the nozzle, and reduces the energy transported by the refrigerating deionized water, actually shielding the nozzle head.

Lastly, concerning the materials, the entire tubular body of the torches 8, 10, and in particular the nozzle heads 28 are made of steel, preferably of an AISI stainless steel.

Figure 7:
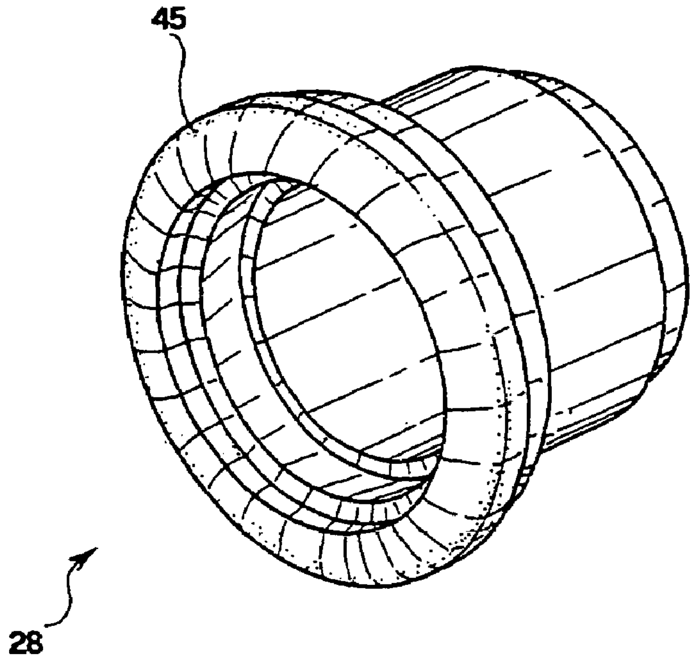
FIG. 7 is a perspective view of a detail of the torches of the preceding Figs.
Figure 8:
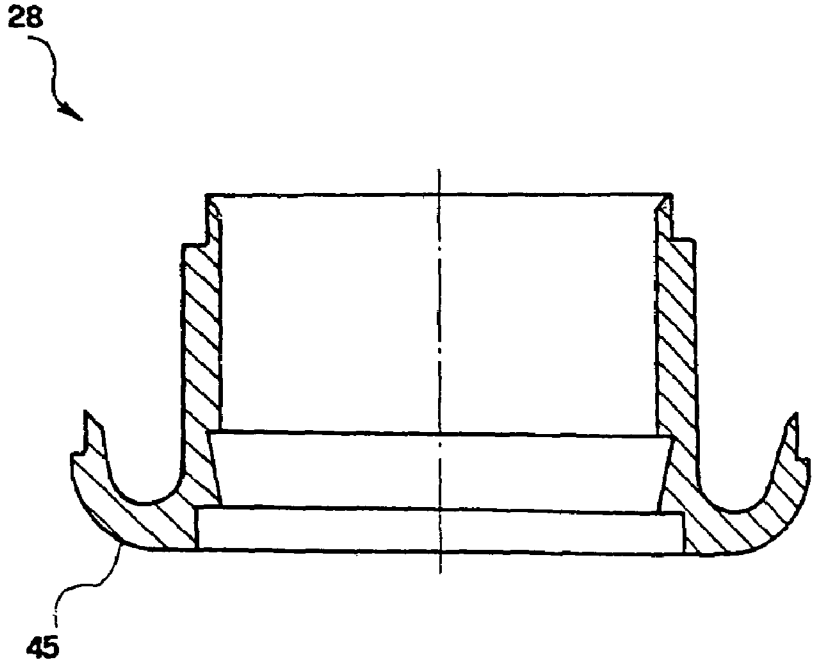
FIG. 8 is a sectional view of the detail of FIG. 7.

A very important feature of the cathodic (FIGS. 7 and 8) and anodic nozzle head is that of comprising a rounded outer edge 45, in particular to decrease the view factor of the surface of the head directly subjected to the plasma thermal radiance.

A preferred rounding is apt to decrease said view factor of at least the 30%, and up to the 40%.

Always concerning the nozzle head, the replacement of the Copper head with a stainless steel head facilitates the soldering to the pipes, them also of stainless steel. The head is sized so as to preserve the fluidodynamic conditions of the cooling water inside of the outside jacket. However, the head thickness decreases to keep the temperature of the outside surface at relatively low values (anyhow higher than those of the Copper) that are in no way critical with regard to the mechanical performance of the materials.

Thus, it is possible to range from a 150° C. operating temperature (at ignited plasma) with the Copper head to a 400° C. temperature with the stainless steel head. The hereto-described innovative interventions carried out on the torches attain the aims of:

abating the ordinary torch maintenance costs;

increasing the torch reliability and duration; and reducing the energy removed by the torch cooling system, decreasing the amount of heat removed as well as the quantity of water utilized.

To the abovedescribed plasma torch a person skilled in the art, in order to satisfy further and contingent needs, could effect several further modifications and variants, all however falling within the protective scope of the present invention, as defined by the appended claims.

What is claimed is:

1. A plasma torch, comprising concentric members, including:

an outside jacket ending with a nozzle head;

a nozzle formed inside said outside jacket; and an electrode provided with a respective electrode head, and comprising respective cooling circuits for a coolant formed inside said outside jacket and inside said electrode, each cooling circuits being formed by a respective reversing pipes having, at said nozzle head and said electrode head respectively, an end passage dividing the reversing pipe in a descending section and in an ascending section, wherein, at the electrode head, the corresponding end passage defines a toroidal slot wherein a toroidal flap is inserted so as to impart a counter U-shaped toroidal course to the end passage, said toroidal flap working as means for disposing heat from the electrode.

2. The plasma torch according to claim 1, wherein said nozzle, at a mouth thereof, comprises a refractory material ring.

3. The plasma torch according to claim 2, wherein said refractory material is silicon carbide.

4. The plasma torch according to claim 1, wherein the outside jacket is coated with a ceramic coating.

5. The plasma torch according to claim 4, wherein said ceramic coating is made of zircon oxide.

6. The plasma torch according to claim 4, wherein the ceramic coating has a thickness ranging from 30 $\mu$m to 70 $\mu$m.

7. The plasma torch according to claim 4, wherein the ceramic coating is a plasma spray coating.

8. The plasma torch according to claim 1, wherein said nozzle head is made of steel.

9. The plasma torch according to claim 8, wherein said steel is stainless steel.

10. The plasma torch according to claim 8, wherein the nozzle head has a rounded outer edge, so as to decrease at least by 30% the view factor of the surface of the nozzle head subjected to plasma thermal radiance.

11. The plasma torch according to claim 1, comprising a central port in the head of the electrode that enables flow of plasmogen gas and/or of materials to be thermally destroyed.

12. The plasma torch according to claim 1, comprising a cathodic electrode having a head with an end portion, wherein the end portion of the head of the cathodic electrode comprises a metallic material coating having a >1600° C. melting temperature.

13. The plasma torch according to claim 12, wherein said metallic material coating is made of tungsten.

14. The plasma torch according to claim 12, wherein said metallic material coating is a plasma spray coating.

15. The plasma torch according to claim 1, wherein said head of said electrode is coated with a metal coating having >0.8 reflectivity, said electrode being an anodic electrode.

16. The plasma torch according to claim 15, wherein said metal coating having >0.8 reflectivity is selected from the group consisting of molybdenum and nickel.

* * * * *